United States Patent [19]
Nagaoka

[11] Patent Number: 6,070,739
[45] Date of Patent: Jun. 6, 2000

[54] FILTERING DEVICE

[76] Inventor: Tadayoshi Nagaoka, 573-2, Oaza Ureshi, Tondabayashi-shi, Osaka-fu, Japan

[21] Appl. No.: 09/012,292

[22] Filed: Jan. 23, 1998

[51] Int. Cl.⁷ ............................. B01D 35/20; B01D 33/06
[52] U.S. Cl. .......................... 210/407; 210/384; 210/403; 210/413; 210/415
[58] Field of Search .................................... 210/407, 413, 210/402, 403, 384, 388, 785, 415; 209/381, 382, 383

[56] References Cited

U.S. PATENT DOCUMENTS

| | | | |
|---|---|---|---|
| 3,483,974 | 12/1969 | Pearsall | 209/382 |
| 4,052,305 | 10/1977 | Arvanitakis | 210/407 |
| 4,663,040 | 5/1987 | Elizondo et al. | 210/402 |
| 4,880,539 | 11/1989 | Crawford et al. | 210/415 |
| 5,618,424 | 4/1997 | Nagaoka | 210/407 |
| 5,779,901 | 7/1998 | Mosca | 210/415 |

*Primary Examiner*—David A. Simmons
*Assistant Examiner*—Frank M. Lawrence
*Attorney, Agent, or Firm*—Hedman, Gibson & Costigan, P.C.

[57] ABSTRACT

A filtering device includes a screen including support rods extending in the axial direction of the screen and arranged generally cylindrically with a predetermined interval, and a cylindrical filter member attached fixedly on the outside of the support rods, a vibrator including a shaft provided in the central portion of the screen coaxially with the screen and at least one leaf spring which is fixed in one end portion thereof to the shaft and is capable of abutting in the other end portion against a part of each of the support rods, and a drive unit for rotating at least one of the screen and the vibrator. In one aspect of the invention, a filtering device includes a screen including support rods extending in the axial direction of the screen and arranged generally cylindrically with a predetermined interval, and a cylindrical filter member attached fixedly on the inside of the support rods, a vibrator including a frame provided on the outside of the screen coaxially with the screen and extending in the axial direction of the screen and at least one leaf spring which is fixed in one end portion thereof to the frame and is capable of abutting in the other end portion against a part of each of the support rods, and a drive unit for rotating at least one of the screen and the vibrator.

14 Claims, 9 Drawing Sheets

FIG. 12

# FILTERING DEVICE

BACKGROUND OF THE INVENTION

This invention relates to a filtering device and, more particularly, to a filtering device suitable for precision filtering in a state submerged in liquid to be treated. Liquid to be treated includes water for general uses, drinking water, river water and pool water.

Known in the art of filtering devices is one which employs a plurality of filter tubes. In this filtering device, a plurality of filter tubes are provided in parallel in a container. Liquid to be treated is introduced from an inlet provided in one end portion of the container via a pump and filtered through these filter tubes and treated liquid is delivered out of a treated liquid outlet provided in the other end of the container.

For the filter tubes used in the prior art filtering device, filter elements for precision filtering which consist of a porous material or a filter cloth having densely formed pores are used. In these filter elements, however, pores of these filter elements are blocked by fine powdery solid particles suspending the liquid to be treated in a relatively short period of time after starting of operation of the filtering device with the result that filtering efficiency is rapidly dropped. For this reason, the filtering operation of the filtering device has to be stopped for performing reverse washing of the surface of the filter elements and resumed after removing the materials which have blocked the pores of the filter elements. Such stopping of the filtering operation and performing of reverse washing need to be repeated frequently during the filtering operation with resulting decrease in the working efficiency. Besides, the blocking of the inside of pores of the filter elements advances notwithstanding the repetition of reverse washing until at last it becomes necessary to take out all of the filter elements from the filter tubes and replace them by new filter elements.

It is, therefore, an object of the present invention to provide a novel high precision filtering device having a high filtering efficiency which is capable of preventing blocking of filter elements while continuing the filtering operation without stopping the filtering operation for performing reverse washing.

SUMMARY OF THE INVENTION

For achieving the above described object of the invention, there is provided a filtering device comprising a screen including support rods extending in the axial direction of the screen and arranged generally cylindrically with a predetermined interval, and a cylindrical filter member attached fixedly on the outside of the support rods, a vibrator including a shaft provided in the central portion of the screen coaxially with the screen and at least one leaf spring which is fixed in one end portion thereof to the shaft and is capable of abuting in the other end portion against a part of each of the support rods, and a drive unit for rotating at least one of the screen and the vibrator.

According to the invention, by rotating at least one of the screen and the vibrator, one end portion of the leaf spring sequentially abuts against each of the cylindrically arranged support rods and is disengaged therefrom and, by the impact of the leaf spring abutting against the support rods, slight vibration occurs in each support rod and the filter member which is fixed thereto. Powdery suspending solid particles in liquid to be treated which tend to be deposited on the surface of the filter member as the liquid enters the filter member are shaken off from the surface of the filter member by this vibration, so that these suspending solids are kept away from the surface of the surface of the filter member whereby blocking of the filter member can be prevented.

Since this filtering device does not require a bulky device for reverse washing or a scraper as in the prior art filtering device, the filtering device can be constructed in a compact design.

In one aspect of the invention, there is provided a filtering device comprising a screen including support rods extending in the axial direction of the screen and arranged generally cylindrically with a predetermined interval, and a cylindrical filter member attached fixedly on the inside of the support rods, a vibrator including a frame provided on the outside of the screen coaxially with the screen and extending in the axial direction of the screen and at least one leaf spring which is fixed in one end portion thereof to the frame and is capable of abutting in the other end portion against a part of each of the support rods, and a drive unit for rotating at least one of the screen and the vibrator.

As the filter member, either of wedge wire, porous plate, wire-mesh and filter cloth can be used. In case a wedge wire is used which is wound about the support rods in such a manner that slits of a predetermined width is formed between adjacent portions of the wedge wire, the cylindrical screen of the wedge-wire type having V-shaped slits are inherently resistant to blocking and, therefore, by applying a slight vibration to the screen with the vibrator, blocking of the slits of the screen can be prevented further efficiently and a continuous operation of the filtering device thereby is ensured.

By adopting a wedge-wire screen having a slit width within the range from 1 micron to 150 microns, a high precision filtering can be achieved by a continuous operation of the filtering device without requiring auxiliary filtering means such as precoating.

BRIEF DESCRIPTION OF THE DRAWINGS

In the accompanying drawings.

DETAILED DESCRIPTION OF PREFERRED EMBODIMENTS

Referring to the accompanying drawings, a preferred embodiment of the invention will now be described.

Figure 1:
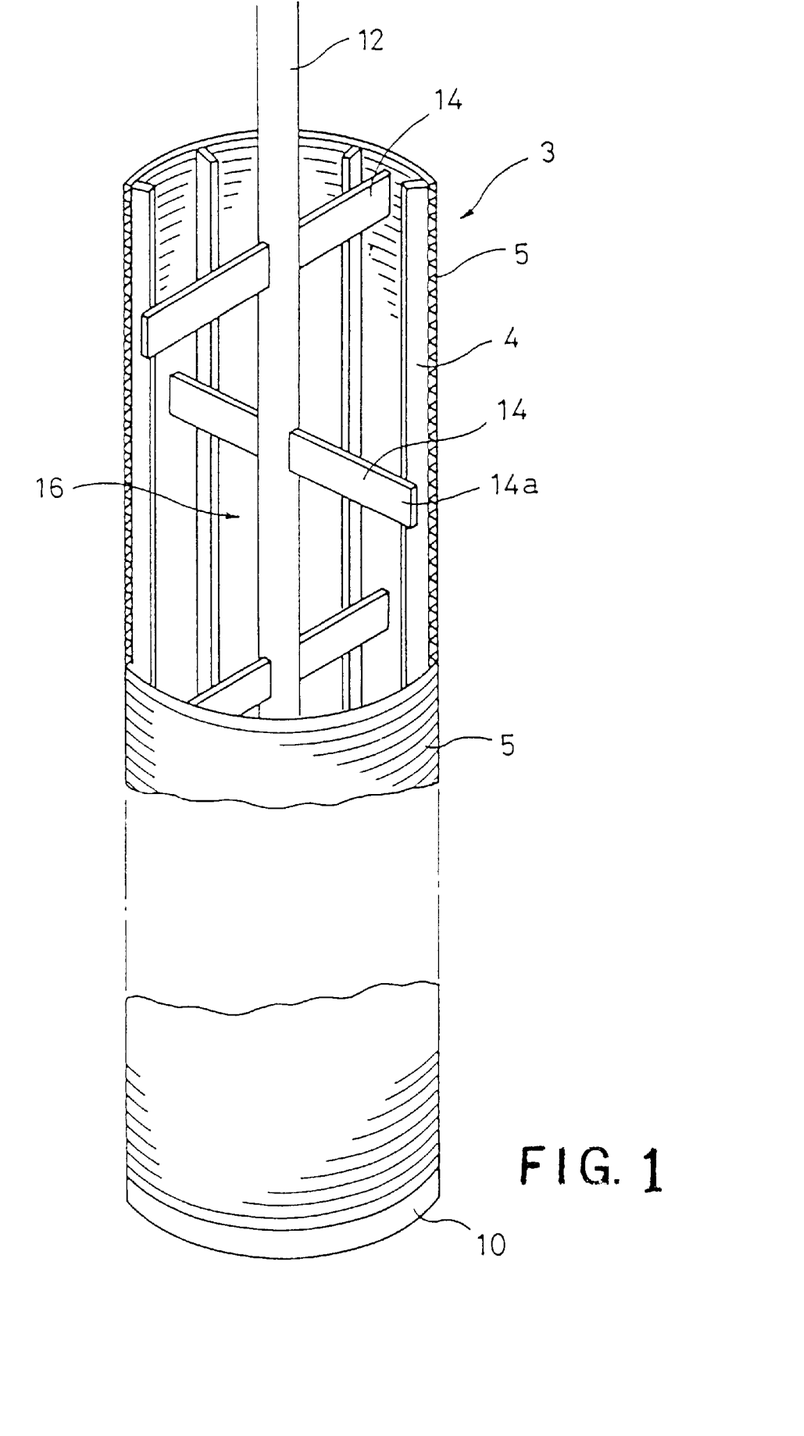
FIG. 1 is a perspective view of an embodiment of the filtering device made according to the invention.
Figure 2:
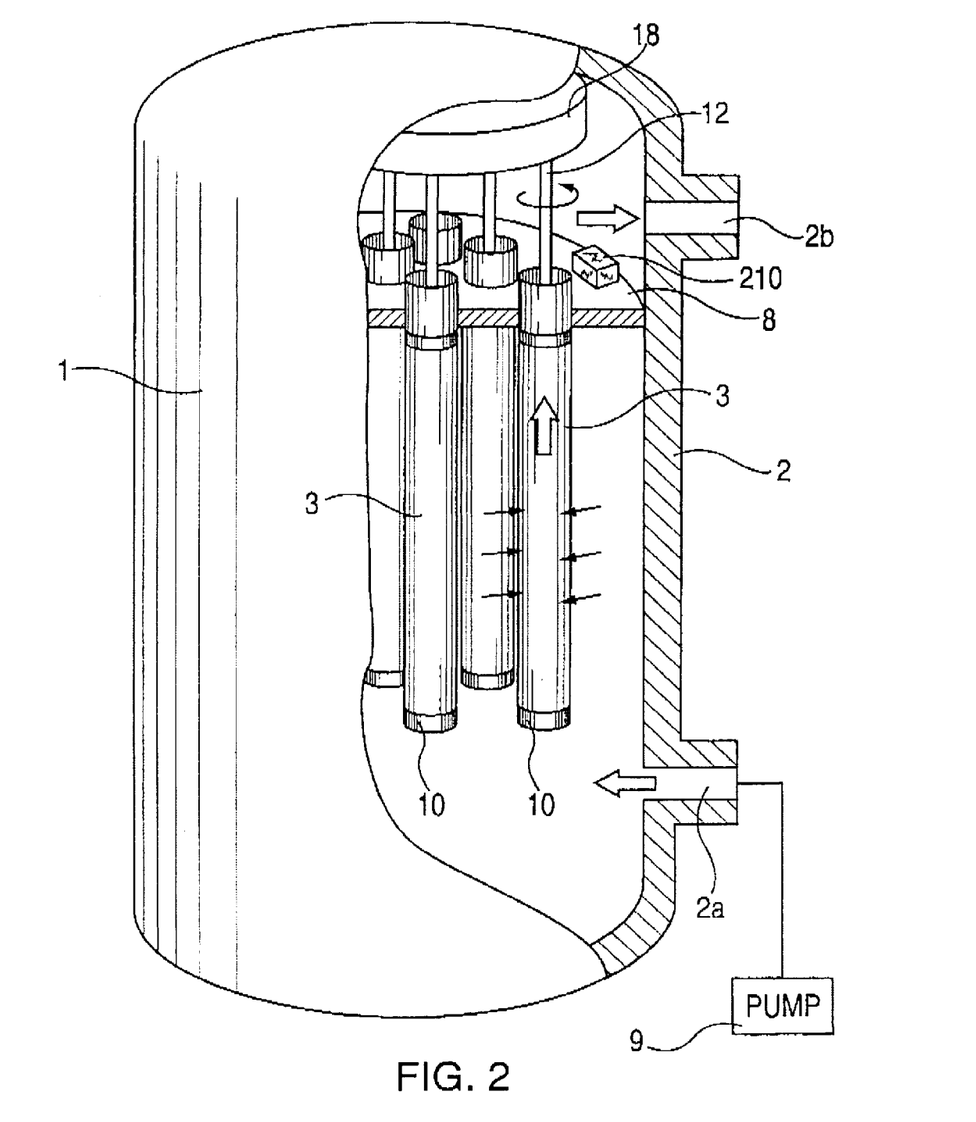
FIG. 2 is a perspective view showing a container of the device with a part thereof taken away.
Figure 3:
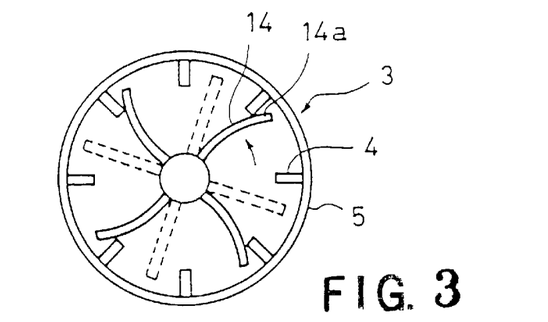
FIG. 3 is a plan view of a vibrator for explaining the operation of the vibrator.

FIGS. 1 to 4 illustrate an embodiment of the invention. A filtering device 1 has, as illustrated in FIG. 2, a horizontally disposed disk-like seal plate 8 in the upper portion of a container 2 having a circular cross section.

To this seal plate 8 are fixed a plurality of cylindrical screens 3 which extend in the vertical direction penetrating through the seal plate 8. An inlet 2a for introducing liquid to be treated is formed in the lower portion of the container 2 and an outlet 2b for delivering out treated liquid is formed in the upper portion of the container 2. A pump 9 is connected to the filtering device 1.

Figure 4:
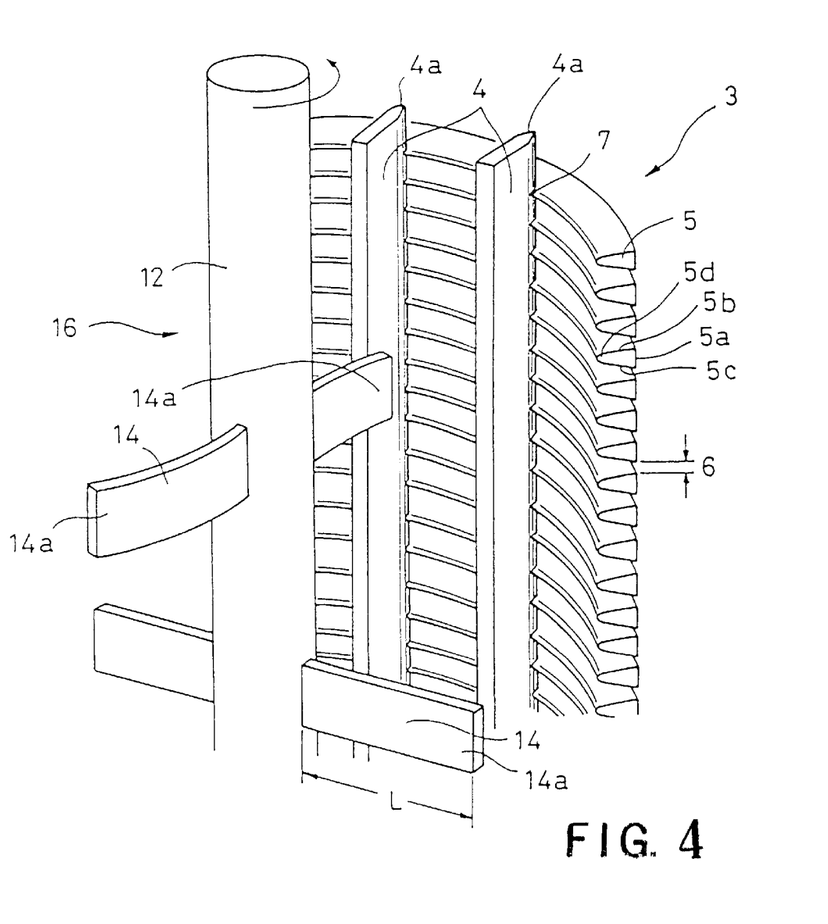
FIG. 4 is an enlarged perspective view of a screen and vibrator shown in FIG. 1.

In the present embodiment, the screen 3 has, as will be apparent from FIG. 4, support rods 4 extending in the axial direction of the screen 3 and arranged generally cylindrically with a predetermined interval and having a projecting portion 4a in a radially outward end portion and a wedge wire 5 wound spirally on the outside of the support rods 4 in substantially crossing direction to the support rods 4. The wedge wire 5 is arranged with its one side 5a facing outside and two other sides 5b and 5c forming a slit 6 which widens radially inwardly between adjacent wedge wire portions and with an inward apex 5d of the wedge wire 5 being welded to the projecting portion 4a of the support rods 4 at crossing points 7 of the wedge wire 5 and the support rods 4. The lower end of the screen 3 is closed by a seal plates 10 (FIG. 2). The wedge wire 5 constitutes a cylindrical filter member.

In the screen 3 is provided a vibrator 16 which consists of a shaft 12 which is disposed in the central portion of the screen 3 coaxially with the screen 3 and a plurality of leaf springs 14 which are fixed to the shaft 12. The upper end portion of the shaft 12 is projecting from the upper end of the screen 3 and is connected to a vibrator drive unit 18 which is provided in the upper portion of the container 2 above the seal plate 8. The vibrator drive unit 18 is imparted with a driving force by means of an unillustrated motor and drives the shafts 12 to rotate at a predetermined speed.

Pairs of the leaf springs 14 are fixed to the shaft 12 along the entire length of a portion of the shaft 12 located in the screen 3 in such a manner that each pair of the leaf springs 14 extend in the radial direction of the screen 3 and cross adjacent pairs of the leaf springs 14. The radial length L (FIG. 4) of each leaf spring 14 is so determined that the front end portion 14a of the leaf spring 14 comes into abutting engagement with the radially inside portion of each support rod 4.

The operation of this filtering device 1 will now be described.

During the filtering operation, the pump 9 is operated to introduce liquid to be treated from the inlet 2a into each screen 3. The liquid to be treated flows upwardly inside of the screen 3 and flows out of the outlet 2b of the upper end portion of the container 2 for recovery.

During the filtering operation, the shaft 12 of the vibrator 16 is rotated by the vibrator drive unit 18.

Assuming now that the shaft 12 is rotated counterclockwise, the leaf spring 14 moves from a state shown in FIG. 1 (i.e., a state shown by a dotted line in FIG. 3) to a state shown in FIG. 4 (i.e., a state shown by a solid line in FIG. 3) with the front end portion 14a abutting against the radially inside portion of the support rod 4. The leaf spring 14 is pushed and bent and thereby is resiliently disengaged from the support rod 4. Thus, while the shaft 12 is rotating, a slight vibration is imparted to each support rod 4 and the wedge wire 5 which is the filter member fixed to the support rod 4 by the impact of the leaf spring 14 abutting against the support rod 4.

Figure 5A:
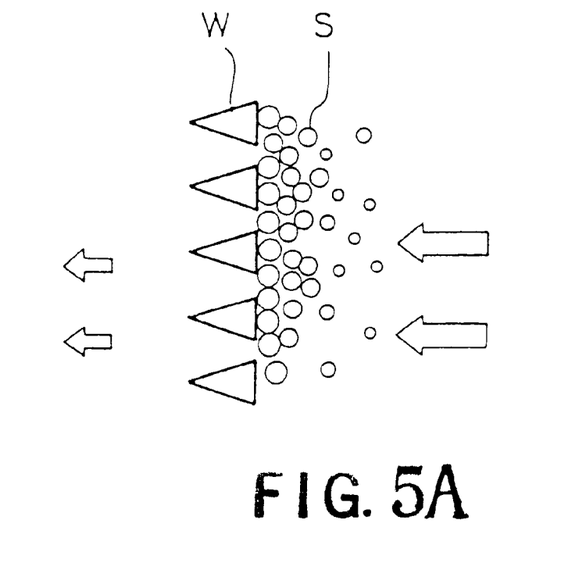
FIGS. 5A and 5B are views explanatory of a state of deposition of suspending solid particles in liquid to be treated to the surface of the screen.
Figure 5B:
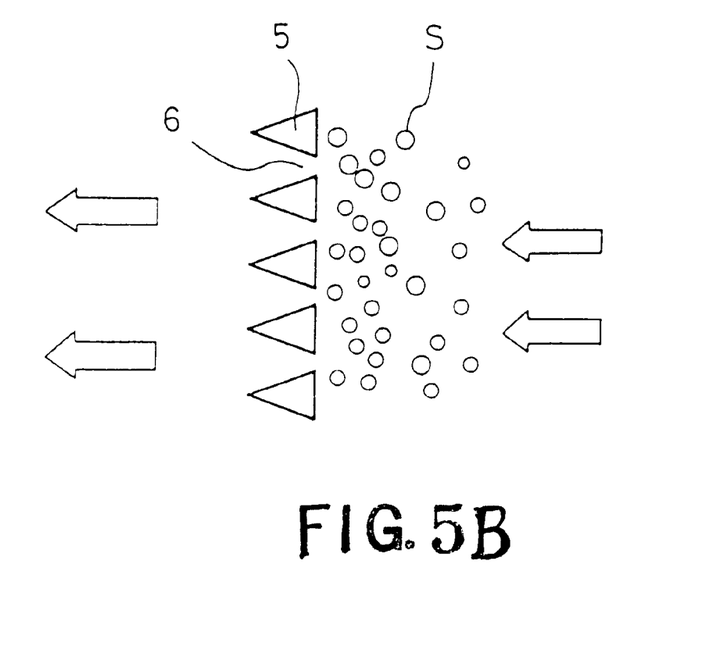

In the prior art filtering device, as the liquid to be treated flows into the slit 6 of the wedge wire 5, powdery solid particles S are deposited on the surface of a wedge wire W as shown in FIG. 5A. According to the filtering device of the present invention, as shown in FIG. 5B, powdery solid particles S which tend to be deposited on the surface of the wedge wire 5 are shaken off from the surface of the wedge wire 5 by the slight vibration imparted by the vibrator 16 through the support rods 4 and are kept away from the surface of the wedge wire 5. As a result, blocking of the slit 6 of the wedge wire 5 by the powdery solid particles can be prevented.

In the above described embodiment, the shaft 12 of the vibrator 16 is rotated. Conversely, the shaft 12 may be fixed and the screen 3 may be connected to a drive means and may be rotated thereby. Alternatively, the vibrator 16 and the screen 3 may both be rotated in reverse direction to each other.

Figure 6:
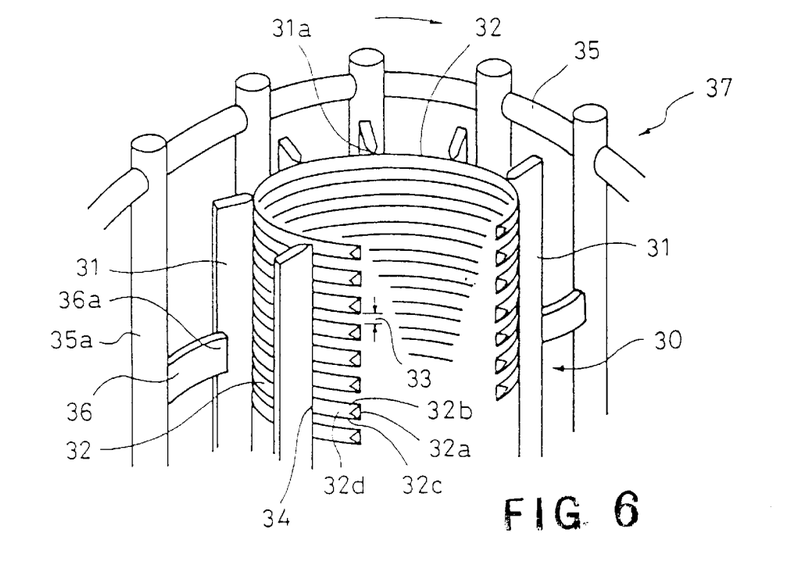
FIG. 6 is a partial perspective view of another embodiment of the invention.
Figure 7:
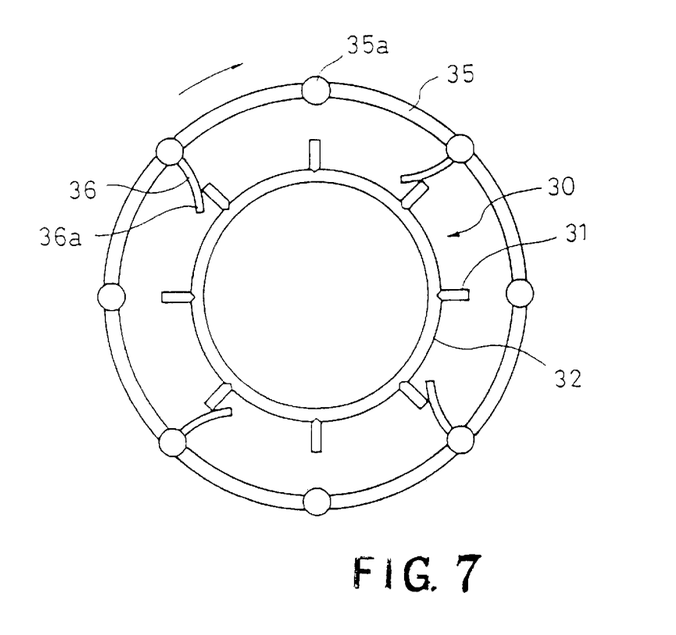
FIG. 7 is a plan view of the vibrator of this embodiment for explaining the operation thereof.

FIGS. 6 and 7 illustrate another embodiment of the invention. This embodiment is suitable for use in a filtering device in which, conversely to the embodiment of FIG. 1, liquid to be treated is caused to flow from the inside of the screen to the outside of the screen and powdery solid particles are collected in the vicinity of the inside surface of the wedge wire.

In this embodiment, a cylindrical screen 30 includes, as shown in FIG. 6, support rods 31 extending in the axial direction of the screen 30 and arranged generally cylindrically with a predetermined interval and having a projecting portion 31a in a radially inward end portion and a wedge wire 32 wound spirally on the inside of the support rods 31 in substantially crossing direction to the support rods 31. The wedge wire 32 is arranged with its one side 32a facing inside and two other sides 32b and 32c forming a slit 33 which widens radially outwardly between adjacent wedge wire portions and with an outward apex portion 32d being welded to the projecting portion 31a of the support rods 31 at crossing points 34 of the wedge wire 32 and the support rods 31. The wedge wire 32 constitutes a cylindrical filter member.

On the outside of the screen 30 is provided a vibrator 37 which consists of a cylindrical frame 35 in the shape of a lattice extending in the axial direction of the screen 30 and a plurality of leaf springs 36 which are fixed at one end portions thereof to axially extending bars 35a of the frame 35 and are capable of abutting against the support rods 31 at the other end portion thereof.

The frame 35 is connected at one end portion thereof to an unillustrated drive unit and the frame 35 is rotated by this drive unit.

Pairs of the leaf springs 36 are fixed to the axial bars 35a of the frame 35 along the entire length of a portion of the frame 35 in which the screen 30 is located in such a manner that each pair of the leaf springs 36 extend in the radial direction of the screen 30 and cross adjacent pairs of the leaf springs 36. The radial length of each leaf spring 36 is so determined that the front end portion 36a of the leaf spring 36 comes into abutting engagement with the radially outside portion of each support rod 31.

During the filtering operation, liquid to be treated is caused to flow from the inside to the outside of the screen 30. As the frame 35 is rotated clockwise in FIG. 7, each leaf spring 36 sequentially abuts against and disengages resiliently from each support rod 31 and repeats this action thereby imparting a slight vibration to the wedge wire 32 through the support rods 31. By this arrangement, powdery solid particles in the screen 30 which tend to be deposited on the inside surface of the wedge wire 32 are shaken off from the inside surface of the wedge wire 32 and are kept away from the inside surface of the wedge wire 32.

In the embodiment of FIG. 6, the frame 35 of the vibrator 37 is rotated. Conversely, the frame 35 may be fixed and the screen 30 may be rotated. Alternatively, both the frame 35 and the screen 30 may be rotated in reverse direction to each other.

In the prior art filtering device in which the screen surface is formed by wedge wire, it is impossible to realize a fine slit of less than 150 microns between adjacent wedge wire sections by reason of manufacturing technique and therefore it is only possible for this type of device to filter out solid particles having a diameter exceeding 150 microns. In case it is necessary for this type of device to separate solid particles having a diameter of less than 150 microns, an extra filter material such as a filter cloth must be attached on the wedge wire screen surface as described in column 1, lines 18–24 and column 2, lines 64–66 of U.S. Pat. No. 4,407,720. In this case, the problem of blockage of meshes of the filter cloth by solid particles arises in the same manner as in the conventional filtering device using filter cloth on the screen surface.

According to an embodiment of the invention, a super fine slit having a diameter ranging from 1 micron to 150 microns can be provided whereby solid particles having a diameter of 1 micron to 150 microns can be easily filtered out without using a filter cloth or other auxiliary filter material.

For making the super fine slit of 1 micron to 150 microns, the screen 3 using the wedge wire can be manufactured by using an apparatus to be described below.

Figure 8A:
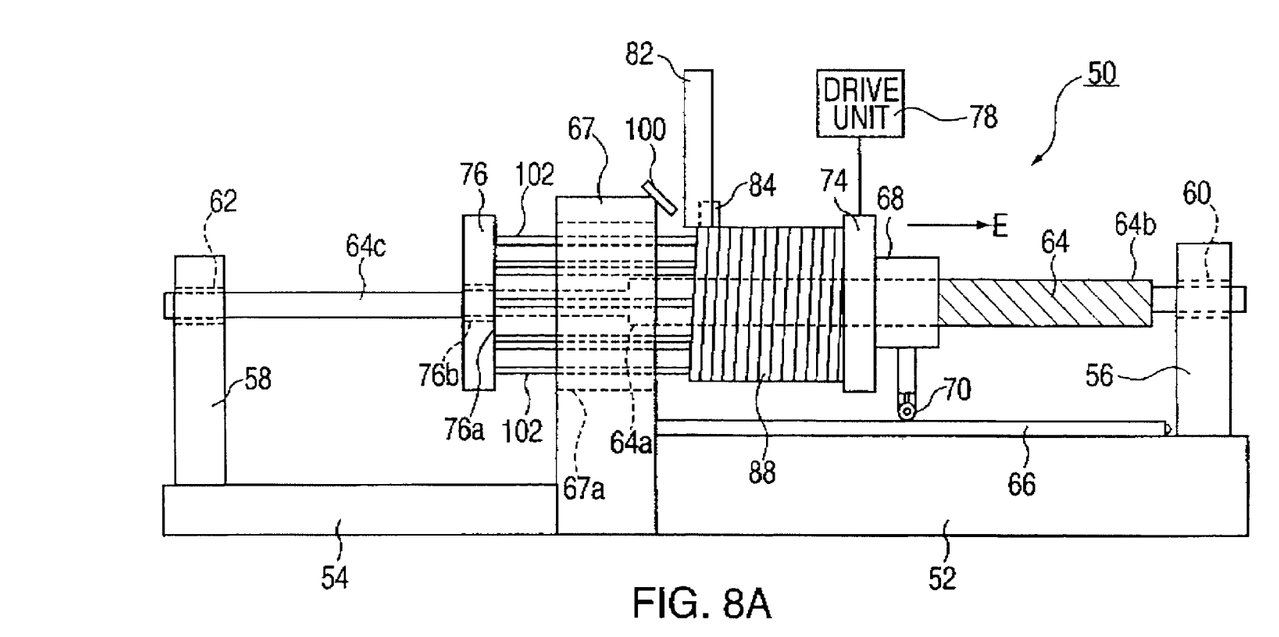
FIGS. 8A and 8B are views showing an apparatus for manufacturing a screen.
Figure 8B:
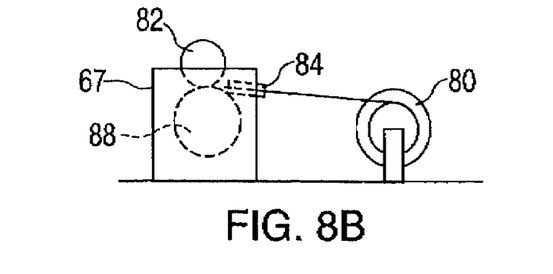
Figure 9A:
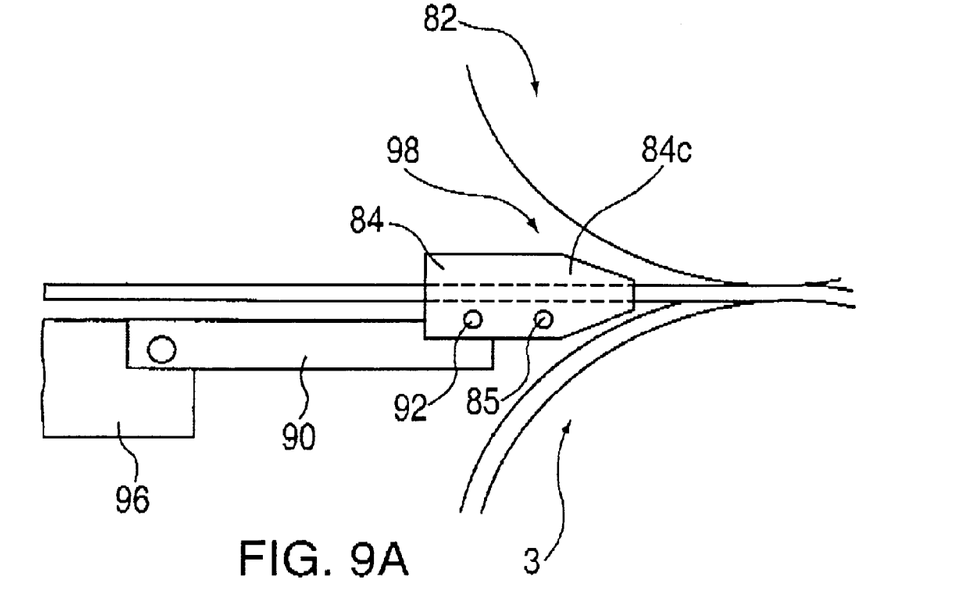
FIGS. 9A and 9B are views showing a wedge-wire holder used in the manufacturing apparatus shown in FIG. 8.
Figure 9B:
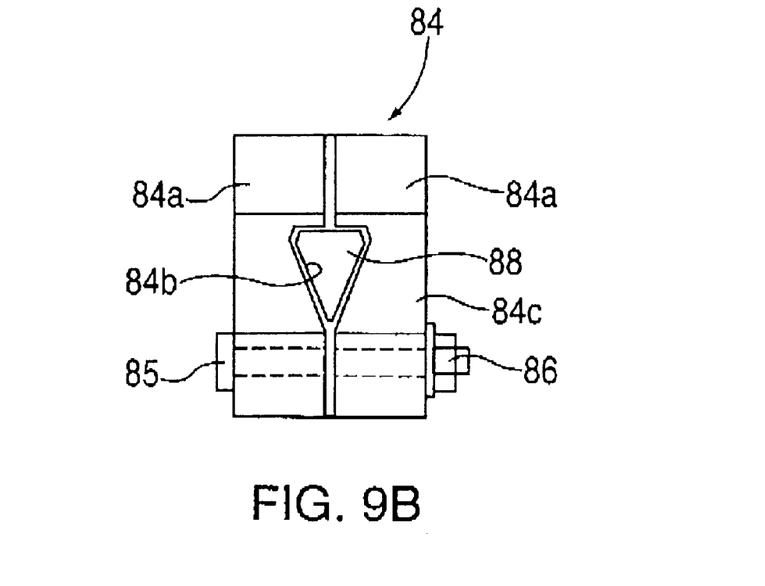
Figure 10:
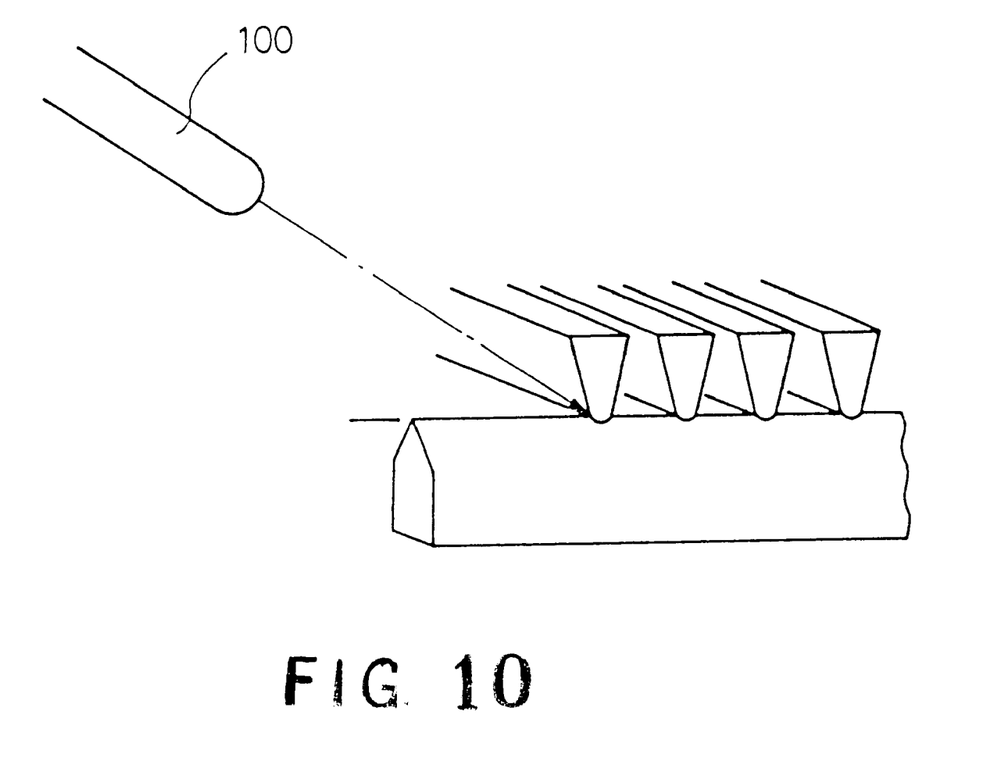
FIG. 10 is a view showing a laser welder used in the manufacturing apparatus shown in FIG. 8.

FIGS. 8 to 10 illustrate an apparatus for manufacturing the screen 3.

A screen manufacturing apparatus 50 has a front bed 52 and a rear bed 54. A screw 64 is rotatably supported by bearings 60 and 62 which are mounted on support frames 56 and 58 provided on the front and rear beds 52 and 54. The screw 64 has a threaded front portion 64b of a large diameter, a central step portion 64a and an unthreaded rear portion 64c of a reduced diameter. Rails 66 are laid on the front bed 52 below the screw 64. A cylindrical screw cover 68 has a threaded inner periphery and is disposed coaxially with the screw 64 in threaded engagement with the screw 64. Wheels 70 are fixed to the front end portion of the screw cover 68 in such a manner that the wheels 70 can run along the rails 66. Thus, the screw cover 68 slides along the screw 64 as the latter is rotated.

An annular front support rod holder 74 is supported rotatably and not movably in the axial direction in the vicinity of a forward end of the screw cover 68. An annular rear support rod holder 76 having a central opening 76b is supported rotatably and not movably in the axial direction on the reduced diameter portion 64c of the screw 64. A drive unit 78 for driving and rotating the front support rod holder 74 is connected to the front support rod holder 74. The drive unit 78 can rotate the front support rod holder 74 with a rotation speed necessary for realizing a desired width of the wedge wire slit. The rear support rod holder 76 is driven by the rotation of the front support rod holder 74. The rear support rod holder 76 has a smaller diameter than the central opening 67a formed in the welder support table 67 and can slide in the central opening 67a. Since the diameter of the large diameter portion 64b is larger than the diameter of the central opening 76b of the rear support rod holder 76, the movement of the rear support rod holder 76 in the advancing direction is prevented by abutting engagement of a front surface 76a of the holder 76 with the step portion 64b of the screw 64. The rear support rod holder 76 is rotated by rotation of the front support rod holder 74.

A wedge wire supply drum 80 storing wedge wire is disposed behind the welder support table 67. A disk-like pressure roll 82 which is disposed in parallel to the screw cover 68 at a predetermined interval from the outer periphery of the screw cover 68 for pressing the wedge wire wound on the support rods to the support rods. The pressure roll 82 is rotated as the screen is rotated.

A wedge wire holder 84 is provided at a location immediately before the wedge wire is wound on the support rods. This wedge wire holder 84 consists of holder port ions 84a and 84b for enabling the wedge wire to pass through them as shown in FIGS. 9A and 9B. After passing the wedge wire, these holder portions 84a and 84b are fixed together by means of bolts 85 and nuts 86. The wedge wire holder 84 has a wedge wire insertion opening 84b having a size slightly larger than the cross section of the wedge wire and has a configuration similar to the cross section of the wedge wire and has a foremost end portion 84c having a configuration similar to a bird's bill. The holder 84 is fixed to a rod 90 by means of a bolt 92 and this rod 90 is pivotably mounted on a frame 96 pivotably in the vertical direction and unmovably in the horizontal direction. By inserting the bill-like foremost end portion 84c deeply in a gap 98 between the screen 3 to be formed and the pressure roll 82, accurate positioning of the wedge wire 88 can be realized.

A laser welder 100 of a known construction is disposed at a location immediately after the wedge wire is wound on the support rods.

Manufacturing of the screen is performed in the following steps:
(a) The above described apparatus is prepared.
(b) Support rods 102 having a projection in a radially outward end portion are placed circumferentially generally in a cylindrical configuration between the front support rod holder 74 and the rear support rod holder 76 and the end portions of the support rods 102 are held by the front and rear support rod holders 74 and 76.
(c) The cylindrically arranged support rods 102 are fed in the advancing direction (in the direction of arrow E in FIG. 8A) by rotating the screw 64 and simultaneously the wedge wire 88 is fed from the wedge wire supply drum 80 and wound on the cylindrically arranged support rods 102 through the wedge wire holder 84.
(d) The wedge wire 88 is welded by the laser welder 100 at its inner apex to the projections of the support rods 102 at each crossing section.
(e) Upon completion of winding and welding of the wedge wire 88, the front and rear support rod holders 74 and 76 are released and a completed screen is taken out of the manufacturing apparatus 50.

In another embodiment of the invention, as shown in FIG. 2, a vibration generator 210 such as one of an electric motor type or a pneumatic pressure type is provided on the seal plate 8. By imparting auxiliary vibration by the vibration generator 210 to the screen 3 via the seal plate 8, blocking of the slits 6 of the wedge wire 5 can be prevented more efficiently.

Figure 11:
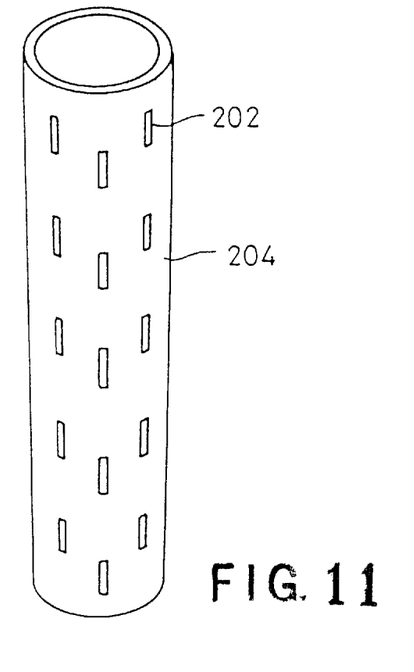
FIG. 11 is a perspective view showing a filter member made of a porous plate.
Figure 12:
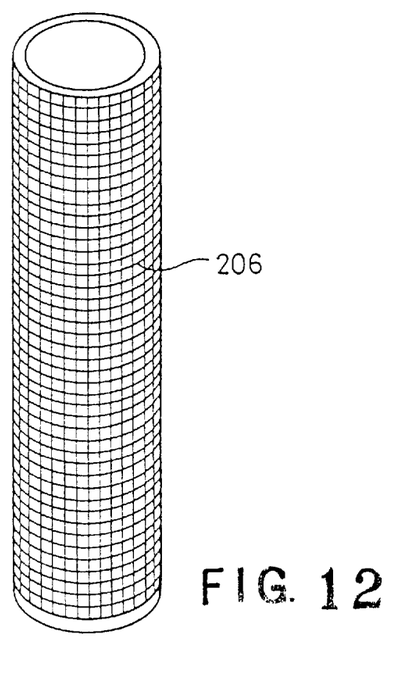
FIG. 12 is a perspective view showing a filter member made by wire-mesh.

The filter material of the screen is not limited to wedge wire but, as illustrated in FIG. 11, the screen may be constructed of a cylindrical perforated plate 204 having a plurality of round holes or slots 202. The screen may also be constructed of a cylindrical wire-mesh 206 as illustrated in FIG. 12.

In the above described embodiments, the screen and the frame have a cylindrical configuration but the invention is not limited to this shape but the screen may have a polygonal configuration. The leaf spring of the vibrator may have other shapes than the one shown in the above described embodiments.

In the above described embodiments, a pair of leaf springs are provided in the radial direction of the screen and pairs of leaf springs which are adjacent to each other in the axial direction of the screen are provided in a crossing direction to the adjacent pair of leaf springs. The invention is not limited to this arrangement but various modifications can be made such, for example, that respective adjacent pairs of leaf springs may be provided in the same direction. The number of leaf springs may be any desired number.

What is claimed is:

1. A filtering device used for precision filtering in a liquid in a submerged state said device comprising:
   a screen including support rods extending in the axial direction of the screen and arranged generally cylindrically with a predetermined interval, and a cylindrical filter member attached fixedly on the outside of the support rods;
   a vibrator including a shaft provided in the central portion of the screen coaxially with the screen and at least one leaf spring which is fixed in one end portion thereof to the shaft and is capable of abutting in the other end portion against a part of each of the support rods; and
   a drive unit for rotating at least one of the screen and the vibrator.

2. A filtering device as defined in claim 1 wherein said filter member is a wedge wire wound spirally about the support rods in such a manner that slits of a predetermined width are defined between adjacent wire portions.

3. A filtering device as defined in claim 2 wherein the width of the slits is within a range from 1 micron to 150 microns.

4. A filtering device as defined in claim 1 wherein the filter member is a porous plate formed with a plurality of round holes or slots.

5. A filtering device as defined in claim 1 wherein the filter member is a wire-mesh.

6. A filtering device as defined in claim 1 wherein the filter member is a filtering cloth.

7. A filtering device as defined in claim 1 which further comprises a vibration generator which imparts vibration to the screen means.

8. A filtering device used for precision filtering a liquid in a submerged state said device comprising:
   a screen including support rods extending in the axial direction of the screen and arranged generally cylindrically with a predetermined interval, and a cylindrical filter member attached fixedly on the inside of the support rods;
   a vibrator including a frame provided on the outside of the screen coaxially with the screen and extending in the axial direction of the screen and at least one leaf spring which is fixed in one end portion thereof to the frame and is capable of abutting in the other end portion against a part of each of the support rods; and
   a drive unit for rotating at least one of the screen and the vibrator.

9. A filtering device as defined in claim 8 wherein said filter member is a wedge wire wound spirally about the support rods in such a manner that slits of a predetermined width are defined between adjacent wire portions.

10. A filtering device as defined in claim 9 wherein the width of the slits is within a range from 1 micron to 150 microns.

11. A filtering device as defined in claim 8 wherein the filter member is a porous plate formed with a plurality of round holes or slots.

12. A filtering device as defined in claim 8 wherein the filter member is a wire-mesh.

13. A filtering device as defined in claim 8 wherein the filter member is a filtering cloth.

14. A filtering device as defined in claim 8 which further comprises a vibration generator which imparts vibration to the screen means.

* * * * *